Patented Nov. 14, 1961

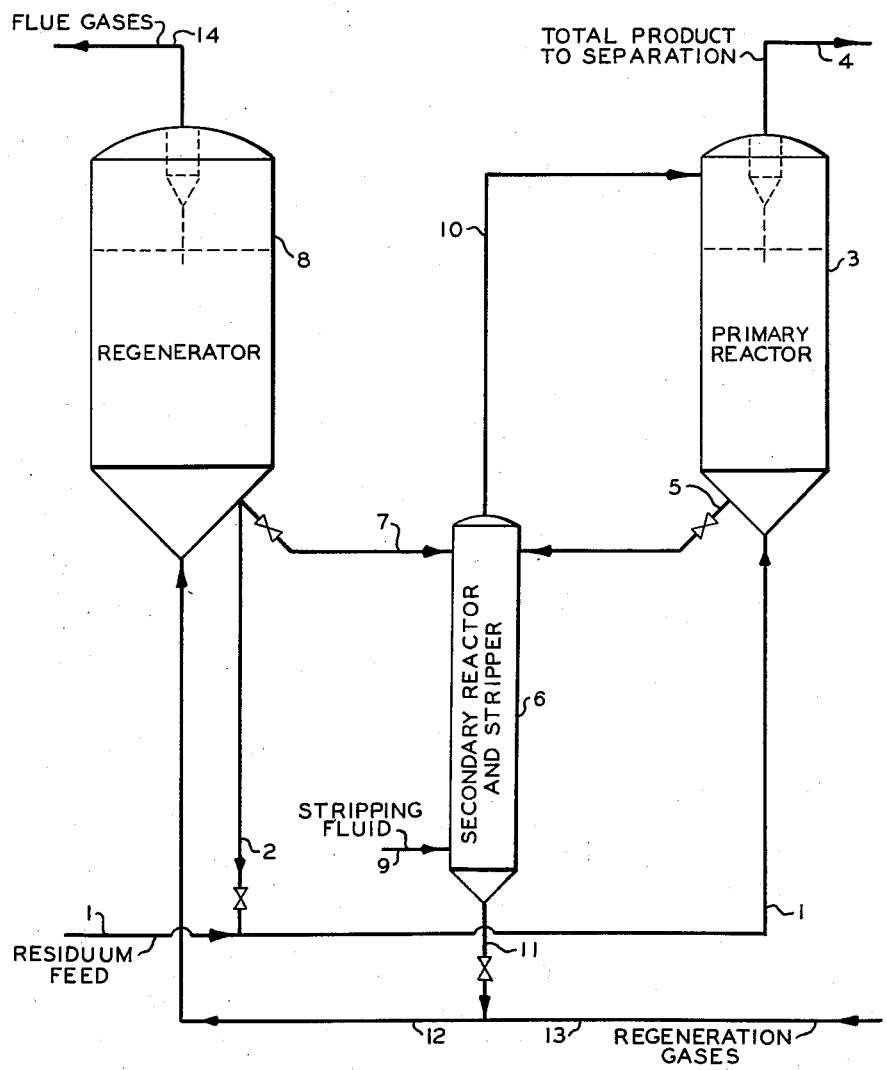

3,008,896
CATALYTIC CRACKING OF RESIDUAL OILS
Shelby D. Lawson, Bartlesville, Okla., assignor to Phillips
Petroleum Company, a corporation of Delaware
Filed Sept. 21, 1959, Ser. No. 841,387
4 Claims. (Cl. 208—74)

This invention relates to the catalytic cracking of residual oils. Also, the invention relates to a novel apparatus for catalytically cracking a heavy oil. In one of its aspects, the invention relates to a novel combination of steps of the cracking of residual oils in the presence of a moving catalyst by contacting the oil with the catalyst at a temperature at which optimum conversion to desired products can be obtained, then admixing used catalyst with hot fresh or regenerated catalyst to further crack oil occluded thereon or admixed therewith and then subjecting said catalyst to the action of a stripping gas or medium. In another aspect of the invention, a heavy oil is cracked in a fluid catalytic cracking operation at a desired conversion temperature yielding optimum conversion to gas oil, the cracked stream is separated from the catalyst which now occludes some oil, the catalyst is admixed with hot fresh or hot regenerated catalyst, passed downwardly through a secondary reactor and stripping zone, in which additional cracking of the oil on the used catalyst takes place, conditioning the catalyst for stripping, and then stripping fluid is introduced to the bottom of the last-mentioned zone for upward travel therethrough, thus resulting in the conditioning of the catalyst in a gradual manner with gradual increase of stripping gas efficiency by virtue of the downflow countercurrent stripping medium contact described. In a further aspect of the invention, it relates to an apparatus for the cracking of a heavy oil in the presence of a catalyst, the apparatus comprising means for admixing used catalyst from a primary reactor with hot fresh or regenerated catalyst, means for providing contact of the admixed used and hot added catalyst, and means for then stripping the thus contacted admixture of catalysts.

In the processing of heavy oils, such as topped crude oil, reduced crude oil, and the like, in the presence of a cracking catalyst, it has been found that the processing should be carried out at lower temperatures than conventionally used in the catalytic cracking of gas oil distillates. When processing the residual oils, it is desired to maintain the conversion to light distillates at about 30 percent. That is, of each 100 barrels of residual oil charged, it is desired to produce about 70 barrels of cycle gas oils which are recovered and processed in a gas oil catalytic cracking system. To effect such low conversion, it is necessary to operate the reactor to which is charged the residual oil at about 860 to 890° F., preferably at about 880° F. for topped crude. Such low reactor temperatures, however, prevent proper stripping of occluded and adsorbed oils from the used catalyst.

It is known to remove catalyst from a cracking zone and to admix with the removed catalyst a mixture of hot regenerated catalyst and stripping gas.

To effect a proper oil recovery, that is, to recover occluded and adsorbed oil from the used catalyst, I separately crack the same at advantageous conditions and then strip any remainder occluded oil or adsorbed oil from the catalyst with a stripping medium. Thus, I have added a secondary reactor-stripper to the primary reactor, to effect cracking of the oils on the spent catalyst, removed from the primary reactor, at between about 900° F. and 930° F., preferably at about 920° F., in which reactor the used catalyst is treated by adding to it a portion of regenerated catalyst at about 1060° F. (range of about 1020 to 1100° F.). In the secondary reactor, the occluded and adsorbed oils are further cracked and then are stripped as by steam, and recovered with the product from the primary reactor.

In the now preferred embodiment, the mixture of used and hot fresh or hot regenerated catalysts is passed downwardly together through the secondary reactor while stripping fluid is introduced into the bottom of the said reactor. This type of separation possesses features and advantages which one skilled in the art in possession of this disclosure and having studied the same carefully will appreciate.

By operating according to my invention, conversion is maintained at about 30 percent, as desired, to produce cycle oils for charging to gas oil distillate catalytic cracking steps, and the spent catalyst is ultimately at a temperature at which proper stripping can be effected. This sequence of steps is found to be highly advantageous.

In plant tests, where conventional temperatures of cracking are used on these residual oils, even at minimum bed level in the reactor, conversions were about 68 percent. Such high conversions (resulting in only about 32 percent cycle gas oils for charging to the gas oil distillate catalytic cracking zone) produce also lower quality and quantity of gasolines, and higher quantities of gases and coke.

Operating according to my invention, approximately 90 to 95 percent of the residual oil is converted in the primary reactor at the desired low conversion conditions, and the remainder is converted in the secondary reactor-stripper at higher temperature and conversion to produce the properly strippable spent catalyst, which is then stripped to produce the total product of high percent cycle gas oil, which is desired, and the stripped catalyst in a condition for convenient and proper return to the regenerator without causing uneven temperatures therein due to uneven coke burnoff, a problem well known in the art.

Further, according to the preferred modus operandi of the invention, stripping fluid does not contact the mixture of used and hot fresh or hot regenerated catalyst until such time as the hotter catalyst has had opportunity to crack the oil in the catalyst mixture while it travels downwardly, as described herein. Using the separate reactor, no short-circuiting of catalyst can take place, each particle having to travel the full length of the reactor.

Thus, my invention catalytically cracks a residual oil at optimum conditions for cycle gas oil production in a first reaction zone, but under conditions in that zone wherein improper subsequent stripping of the catalyst leaving said zone would result, and then catalytically cracks the oil remaining on the spent catalyst from the primary reactor in a secondary reactor-stripper in the presence of added regenerated catalyst at higher temperatures and higher conversion than in the primary reactor, so that the final spent catalyst is at temperatures at which stripping and ensuing regeneration can be successfully effected.

The addition of regenerated catalyst to the secondary reactor-stripper can be controlled in response to the temperature desired, e.g., 920° F., in this unit.

It is an object of this invention to provide an improved process for catalytic cracking of residual or heavy oils. It is another object of this invention to provide a modus operandi for the cracking of residual oils to produce maximum cycle gas oils therefrom while at the same time arranging for a proper conditioning of used catalyst for stripping and regeneration. It is a further object of this invention to provide a modus operandi for the treatment of catalyst which has been used for cracking of heavy oils at temperatures at which the catalyst, as obtained as used catalyst, contains adsorbed thereon or occluded therein a portion of the oil which has been contacted therewith. It is a further object of this invention to provide means for the handling of a heavy oil and a catalyst in an operation in which the oil is subjected on the catalyst to relatively low conversion per pass to ultimate distillates.

Other aspects, objects and the several advantages of the invention are apparent from this disclosure, the drawing and the appended claims:

According to this invention, there is provided a process for the cracking of a heavy oil which comprises admixing the oil in a primary reaction zone with a catalyst, in said zone effecting a desired conversion of the heavy oil resulting in a used catalyst having adsorbed thereon and/or occluded therein some oil, separating said used catalyst from the converted oil stream, admixing said used catalyst with unused hot fresh and/or hot regenerated catalyst, causing intimate contacting of the admixed catalyst for a period of time sufficient to accomplish a cracking at a higher temperature than that employed in the first-mentioned reaction zone to accomplish a higher degree of conversion and then contacting said catalyst mixture with a stripping fluid to strip therefrom additional valuable product and to obtain a catalyst which has now been conditioned for regeneration.

Also, according to the invention, there are provided means for the cracking of a heavy oil in the presence of a catalyst comprising means for admixing used catalyst from a primary reactor with hot fresh or hot regenerated catalyst, means for providing contact of the admixed used and hot added catalyst for a time sufficient to obtain conversion of adsorbed and/or occluded oil on or in the used catalyst and means for then stripping the thus contacted admixture of catalysts.

Referring now to the drawing, a heavy oil is passed by way of pipe or riser 1 together with hot regenerated catalyst fed to pipe 1 by means of pipe 2 to primary reactor 3 wherein the heavy oil and catalyst are maintained for a time sufficient to complete the conversion of the heavy oil in the presence of the catalyst to an extent and at a temperature desired. A cracked product stream is taken off overhead by way of pipe 4. Used catalyst is removed from reactor 3 by way of pipe 5 and passed to secondary reactor and stripper 6. As the used catalyst enters vessel 6, it is admixed with hot regenerated catalyst passed to vessel 6 by means of pipe 7 from regenerator 8. The admixed used catalyst and hot catalyst pass downwardly through vessel 6 toward the bottom thereof. Just before reaching the bottom of vessel 6, the mixture of catalysts is met with a stripping fluid introduced by way of pipe 9. The catalyst at this point presents a mixture of catalysts in which the particles of catalyst resulting from reactor 3 have been conditioned by cracking therefrom the oil as herein described. Vapors resulting from the operation effected in vessel 6 pass by way of pipe 10 to the top of reactor 3 for removal by way of pipe 4 therefrom. The thus conditioned catalyst passes from vessel 6 by way of pipe 11 into pipe 12 through which it passes together with regeneration gases introduced by pipe 13 to regenerator 8 for regeneration. Flue gases resulting from the regeneration operation in regenerator 8 are removed by way of pipe 14.

The following data are pertinent to the invention.

*Specific example*

Regenerator 8:
   Temperature, ° F _____ 1060
   Pressure, p.s.i.g _____ 9
Reactor 3:
   Temperature, ° F _____ 880
   Pressure, p.s.i.g _____ 10
   Cat./oil wt. ratio _____ 9:1
   Conversion, percent _____ 30
Reactor-stripper 6:
   Temperature, ° F _____ 920
   Pressure, p.s.i.g _____ 11
   Cat./oil wt. ratio (based on the original feed) _____ 10:1
   Conversion,[1] percent _____ 40
Residuum charge 1 (topped crude):[2] API @ 60/60° F _____ 15.0

[1] Of non-distillable material on catalyst which is converted to cycle oil.
[2] Panhandle crude topped crude.

In conventional practice when operating at, e.g., 920° F. for the catalytic cracking of the residuum feed, such temperature being satisfactory for efficient stripping of the used catalyst, the conversion is approximately 50 percent with high quantity of coke laydown and dry gas production. That is, the entire residuum feed is converted at this high temperature with these detrimental results. While operating according to my invention, wherein the residuum is catalytically cracked at lower temperatures, e.g., 880° F., only 30 percent conversion is effected to produce the large quantity of cycle gas oils which are then converted in a subsequent catalytic cracking operation at optimum conditions, and, at this low conversion rate used in my invention, less coke laydown and less dry gas are produced. The subsequent conversion of the material remaining on the catalyst is, by my invention, effected at the 920° F. to effect efficient stripping of the used catalyst with the additional production of cycle gas oils.

Although the invention has been described with reference to the so-called fluid catalytic cracking type operation, I do not intend to be limited to fluid operations only. That is, my invention is also advantageously used in the moving bed or thermofor catalytic cracking operation.

Reasonable variation and modification are possible within the scope of the foregoing disclosure, the drawing and the appended claims to the invention the essence of which is that used catalyst removed from a catalytic cracking operation wherein a heavy oil is cracked under conditions which are not conducive to proper catalyst stripping is admixed with hot fresh and/or hot regenerated catalyst, contacted therewith to effect a cracking of adsorbed or occluded oil from said used catalyst and then said thus treated used catalyst is stripped to recover therefrom additional valuable products and said catalyst in a condition suitable for regeneration, in its preferred form the contacting with the hot fresh and/or hot regenerated catalyst being effected under conditions of temperature and time to accomplish a cracking at a temperature higher than the cracking operation resulting in the used catalyst and at a conversion which is higher than said operation resulting in said used catalyst; the contacting of the used and hot fresh and/or hot regenerated catalyst in the now preferred embodiment being accomplished in a down flow contacting zone into which stripping fluid is introduced essentially only at the bottom thereof.

I claim:

1. A method for catalytically cracking a liquid residual oil under conditions yielding only about 30 percent conversion of the residual oil to provide gas oils for later gas oil catalytic cracking or conversion which results in a catalyst which has adsorbed thereon and/or occluded therein a portion of the residual charge oil which has been insufficiently cracked which comprises the steps in combination as follows:

(a) separating used catalyst from the main body of oil treated therewith;
  (b) admixing the thus used catalyst with unused catalyst at a temperature higher than said used catalyst;
  (c) contacting the thus admixed catalysts for a time sufficient to cause cracking of the liquid oil in the used catalyst to occur prior to contacting said catalyst with an effective stripping fluid to effect about 40 percent conversion of said liquid oil;
  (d) then contacting the admixture of catalysts with an effective stripping fluid;
  (e) recovering cracked products and stripping fluid from said admixture of catalysts;

(f) and recovering an admixture of catalysts suitable for regeneration without causing problems due to uneven coke burnoff in the regeneration zone which is used.

2. A method according to claim 1 wherein the conversion of the liquid oil on the used catalyst in the admixture of catalysts is effected at a temperature substantially higher than that prevailing in the operation resulting in the used catalyst and at a conversion higher than that obtained in the operation resulting in the used catalyst.

3. A method according to claim 1 wherein at least the first contacting is effected in a down flow reaction zone.

4. A method for catalytically cracking a liquid residual oil under conditions yielding only about 30 percent conversion of the residual oil including a temperature in the range 860–890° F. to provide gas oils for later gas oil catalytic cracking or conversion which results in a catalyst which has adsorbed thereon and/or occluded therein a portion of the residual charge oil which has been insufficiently cracked which comprises the steps, in combination, as follows:

(a) separating used catalyst from the main body of oil treated therewith;

(b) admixing the thus used catalyst with unused catalyst at a temperature higher than said used catalyst;

(c) passing mixed catalyst downwardly through an elongated reaction zone and then downwardly through a stripping zone;

(d) contacting the thus admixed catalysts in said elongated reaction zone for a time sufficient to cause cracking of the liquid oil in the used catalyst to occur prior to contacting said catalyst with an effective stripping fluid to effect further substantial conversion of said liquid oil;

(e) then contacting the admixture of catalysts in said stripping zone with a stripping fluid;

(f) recovering cracked products and stripping fluid from said admixture of catalysts;

(g) by-passing the recovered cracked products and stripping fluid around the main body of oil and catalyst being treated therewith; and (h) recovering an admixture of catalysts suitable for regeneration without causing problems due to uneven coke burn-off in the regeneration zone which is used.

References Cited in the file of this patent

UNITED STATES PATENTS

| | | |
|---|---|---|
| 2,451,619 | Hengstebeck et al. | Oct. 19, 1948 |
| 2,487,132 | Hemminger | Nov. 8, 1949 |
| 2,589,984 | Borcherding | Mar. 18, 1952 |